United States Patent
Langan et al.

(10) Patent No.: US 6,956,977 B2
(45) Date of Patent: Oct. 18, 2005

(54) METHODS FOR IMPROVING CONTRAST BASED DYNAMIC RANGE MANAGEMENT

(75) Inventors: David Allen Langan, Clifton Park, NY (US); Jean Lienard, Clamart (FR)

(73) Assignee: General Electric Company, Niskayuna, NY (US)

( * ) Notice: Subject to any disclaimer, the term of this patent is extended or adjusted under 35 U.S.C. 154(b) by 645 days.

(21) Appl. No.: 09/682,235

(22) Filed: Aug. 8, 2001

(65) Prior Publication Data

US 2003/0031378 A1 Feb. 13, 2003

(51) Int. Cl.[7] .............................. G06K 9/38; G06K 9/40
(52) U.S. Cl. ...................................... 382/272; 382/274
(58) Field of Search ................................ 382/169, 274, 382/272, 132, 205, 308

(56) References Cited

U.S. PATENT DOCUMENTS

| | | | |
|---|---|---|---|
| 5,357,549 A | * 10/1994 | Maack et al. | ................... 378/62 |
| 5,579,445 A | 11/1996 | Loce et al. | |
| 5,588,071 A | * 12/1996 | Schultz | ....................... 382/168 |
| 5,666,470 A | 9/1997 | Parker | |
| 5,687,297 A | 11/1997 | Coonan et al. | |
| 5,696,845 A | 12/1997 | Loce et al. | |
| 5,758,034 A | 5/1998 | Loce et al. | |
| 5,862,305 A | 1/1999 | Girmay et al. | |
| 6,061,143 A | 5/2000 | Schweid et al. | |
| 6,141,399 A | * 10/2000 | Tsujii | ........................ 378/98.7 |
| 6,173,029 B1 | 1/2001 | Xie et al. | |
| 6,269,176 B1 | 7/2001 | Barski et al. | |
| 6,370,265 B1 | * 4/2002 | Bell et al. | .................... 382/132 |
| 6,546,124 B1 | * 4/2003 | Hopple et al. | .............. 382/132 |
| 6,711,302 B1 | * 3/2004 | Lee | ............................. 382/275 |

OTHER PUBLICATIONS

US 6,055,290, 4/2000, Xie et al. (withdrawn)

* cited by examiner

*Primary Examiner*—Amelia M. Au
*Assistant Examiner*—Wes Tucker
(74) *Attorney, Agent, or Firm*—Fletcher Yoder

(57) ABSTRACT

A method for compressing an intensity dynamic range of an input image to a reduced intensity dynamic range of an image display device includes defining a plurality of units of the input image, determining a local mean estimate of an intensity of each of the plurality of units of the input image, generating a contrast modification processing value for each local mean estimate, and generating an output intensity value, for each local mean estimate, by using only the generated contrast modification processing value and an input intensity value.

33 Claims, 4 Drawing Sheets

METHODS FOR IMPROVING CONTRAST BASED DYNAMIC RANGE MANAGEMENT

BACKGROUND OF INVENTION

This invention relates generally to contrast-based dynamic range management (C-DRM), and more particularly to a method, a related memory medium, and an apparatus for implementing and performing a contrast-based dynamic range management algorithm.

Digital x-ray imaging is a well-known, non-contact technique for observing, in real time, interior aspects of an object. In practice, an x-ray beam is generated and targeted on an object of interest. A detecting device is positioned on the other side of the object and detects the x-rays transmitted through the object. The detected x-ray signals are converted to digital signals that represent various features in the object, are further processed, and the resulting signal is displayed on an image display device such as a CRT.

One of the fundamental image processing problems in digital x-ray imaging is the need to transform the intensity dynamic range of the input image to the dynamic range supported by an available display device. Typically, the intensity dynamic range of an image exceeds the dynamic range of the display mechanism by several times. The objective of the transformation accordingly is to compress the "DC" or mean component of the different regions comprising the image so that the dynamic range (typically 256 gray levels) of an available display device may be utilized in a fashion which maximizes the displayed image contrast taking into account, as well, the generally recognized limitation of the human eye of discerning only 256 gray levels.

Common approaches to achieving such transformations are known as "unsharp masking" and "extended dynamic range (EDR)", the latter a special adaptation of the former. The conventional approach to performing the EDR algorithm, in general, is simply to subtract a portion of the mean from the input signal. However, if the input image is square root encoded, a contrast gain can be added to compensate to some extent for the non-linear attenuation of the contrast signal and subsequent contrast deficit.

SUMMARY OF INVENTION

In one aspect of the invention a method is provided for compressing an intensity dynamic range of an input image to a reduced intensity dynamic range of an image display device. The method comprises defining a plurality of units of the input image, determining a local mean estimate of an intensity of each of the plurality of units of the input image, generating a contrast modification processing value for each local mean estimate, and generating an output intensity value, for each local mean estimate, by using only the generated contrast modification processing value and an input intensity value.

In another aspect, an apparatus is provided for compressing an intensity dynamic range of an input image to a reduced intensity dynamic range of an image display device. The apparatus comprises an image detector, and a computer coupled to the image detector. The computer is configured to define a plurality of units of the input image, determine a local mean estimate of an intensity of each of the plurality of units of the input image, generate a contrast modification processing value for each local mean estimate, and generate an output intensity value, for each local mean estimate, by using only the generated contrast modification processing value and an input intensity value.

In yet another aspect, a computer readable medium encoded with a program executable by a computer for compressing an intensity dynamic range of an input image to a reduced intensity dynamic range of an image display device is provided. The program is configured to instruct the computer to define a plurality of units of the input image, determine a local mean estimate of an intensity of each of the plurality of units of the input image, generate a contrast modification processing value for each local mean estimate, and generate an output intensity value, for each local mean estimate, by using only the generated contrast modification processing value and an input intensity value.

In a further aspect, a method for compressing an intensity dynamic range of an input image to a reduced intensity dynamic range of an image display device is provided. The method comprises defining a plurality of units of the input image, determining a local mean estimate of an intensity of each of the plurality of units of the input image using a morphological filter, generating a contrast modification processing value for each local mean estimate, and generating an output intensity value, for each local mean estimate, by using the generated contrast modification processing value and an input intensity value.

In a still further aspect, a method for compressing an intensity dynamic range of an input image to a reduced intensity dynamic range of an image display device is provided. The method comprises defining a plurality of units of the input image, determining a local mean estimate of an intensity of each of the plurality of units of the input image, generating a contrast modification processing value for each local mean estimate using a sigmoid look-up table, and generating an output intensity value, for each local mean estimate, by using the generated contrast modification processing value and an input intensity value.

DETAILED DESCRIPTION

Figure 1:
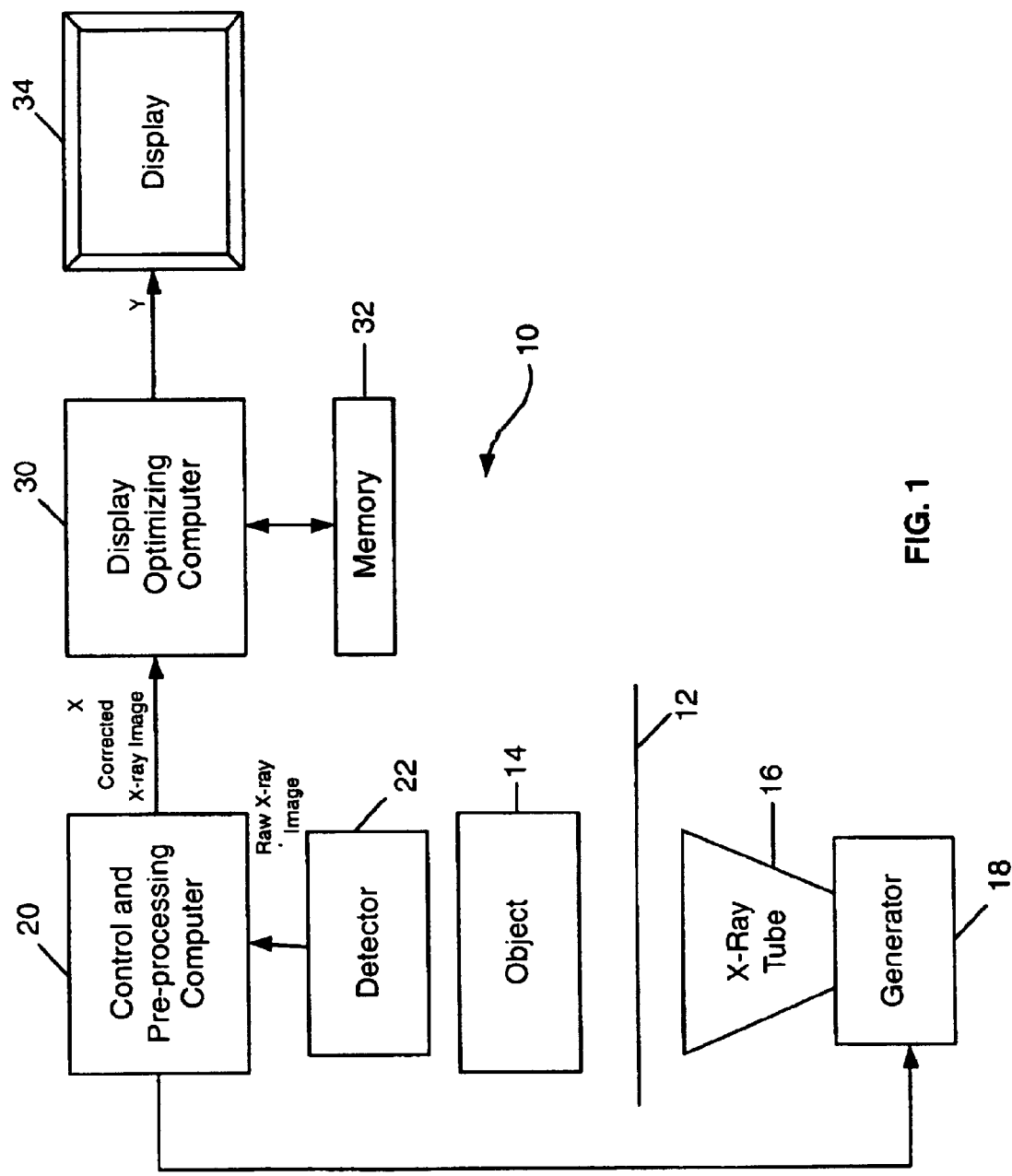
FIG. 1 is schematic flow diagram of an x-ray imaging system implementing and performing a C-DRM algorithm in accordance with the invention.

FIG. 1 is a schematic flow diagram of an x-ray imaging system 10 which can implement and perform the C-DRM processing algorithm of the invention. System 10 includes a table 12 on which an object 14 is placed prior to being imaged (e.g., a human body). Object 14 is irradiated by x-rays emitted by an x-ray tube 16, driven by a generator 18 under exposure management control by a control and pre-processing computer 20. X-rays passing through the object 14 are attenuated in differing amounts depending upon the character of the body portions, and conditions therein, of the object 14 being imaged. Thus, the variously attenuated x-rays impinge upon and are detected by an image detector 22, the image signal output of which is supplied to the control and preprocessing computer 20, all in conventional fashion. The image detector 22 may be a digital detector or an analog detector. In use, an analog detector is coupled with a pick up tube or CCD resulting in a digital imager. As is likewise conventional, the preprocessing computer 20 controls various functions of the x-ray imaging process including, e.g., offset, gain, bad pixel correction, exposure management (e.g., as to the x-ray tube 16 and generator 18) and scaling operations and, further, preprocesses the received x-ray image data so as to produce a corrected x-ray image data output X to a display optimizing computer 30.

A display-optimizing computer 30 includes a memory 32 for processing the image data X output by the preprocessing computer 20. Image data X is to be processed in accordance with the C-DRM algorithm of the invention by the computer 30 and, further, performs related display optimizing processing, such as spatial and temporal filtering, zoom, and display control functions, for producing an optimized output signal Y. Signal Y is supplied to, and displayed by, display unit 34. Computer 30 is programmed to perform functions described above and all exemplary embodiments described below, accordingly, as used herein, the term computer is not limited to just those integrated circuits referred to in the art as computers, but broadly refers to computers, processors, microcontrollers, microcomputers, programmable logic controllers, application specific integrated circuits, and other programmable circuits.

Figure 2:
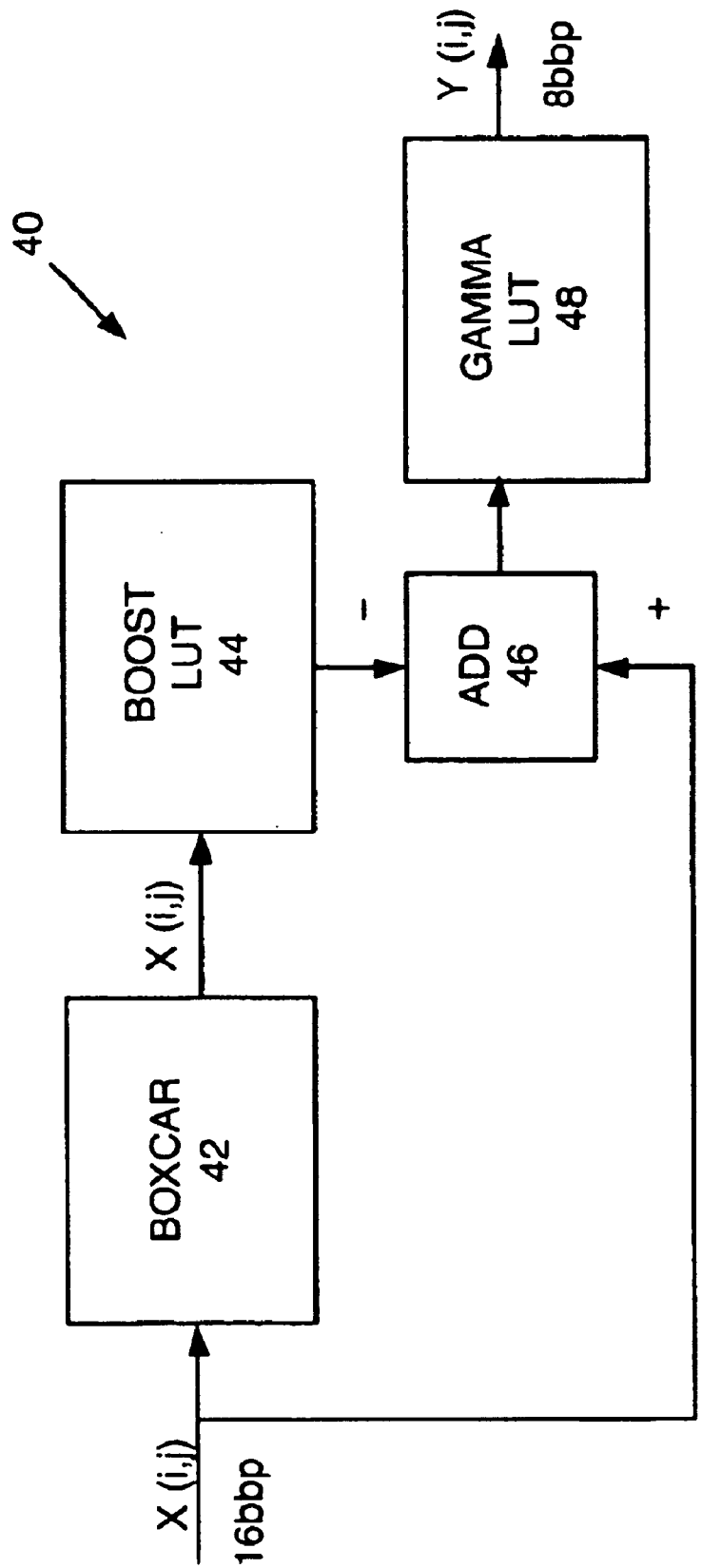
FIG. 2 is a flow diagram of an EDR algorithm processor of the prior art.

FIG. 2 is a flow diagram of an EDR algorithm processor 40 of the prior art. An EDR function is computed and implemented in the following manner:

$$Y(i,j) = \text{Gamma}[x(i,j) - \text{Boost}[\bar{x}(i,j)]] \quad (1)$$

where:

y(i,j) is the $(i,j)^{th}$ pixel value of the output image;

x(i,j) is the $(i,j)^{th}$ pixel value of the input image; and $\bar{x}(i,j)$, i.e., (x_bar(i,j)), is the local spatial mean intensity value of the $(i,j)^{th}$ pixel, derived from a moving-average algorithm such as a BOXCAR average 42. In practice, the x-rays are converted to photons which, in turn, are converted to electrons in an x-ray imager. The electrons are then digitized by an analog-to-digital converter ("A/D" or "ADC") and basic image corrections are performed, such as adjustments to gain, offset and scaling, after which the image is ready to be processed for display.

The intensity value x of an input unit, such as a pixel, (i,j) of an image is first processed by a BOXCAR function 42 that determines the local mean intensity value of the desired unit at that (i,j) pixel location. (An "x" is used herein to designate an input intensity at a pixel location and, thus constitutes an individual scalar value; by contrast, an "X" designates the intensity image value, and thus is a vector value.) The BOXCAR function 42 utilizes a plurality of units, such as a neighborhood of pixels, which includes and is centered on the input pixel, to calculate the local spatial mean intensity value $\bar{x}(i,j)$—(see, terms of Equation (1), supra).

As illustrated in FIG. 2, BOOST LUT 44 includes a look-up table (LUT) which specifies the intensity reduction of the input image signal x(i,j) as a function of the local spatial mean intensity value $\bar{x}(i,j)$. An adder (ADD) 46 combines the (negative) output of BOOST LUT 44 and the input image signal x(i,j) (see Equation (1)) and supplies the result to GAMMA LUT 48, which then compresses the result of the unsharp masking, or subtraction, operation of an ADD 46 to 256 levels (8 bits per pixel, or 8 bpp). The LUTs 44 and 48 are indexed by the appropriate pixel intensity values given in equation (1). Thus, each of the BOOST LUT 44 and the GAMMA LUT 48 jointly manage both mean and contrast modification functions.

Figure 3:
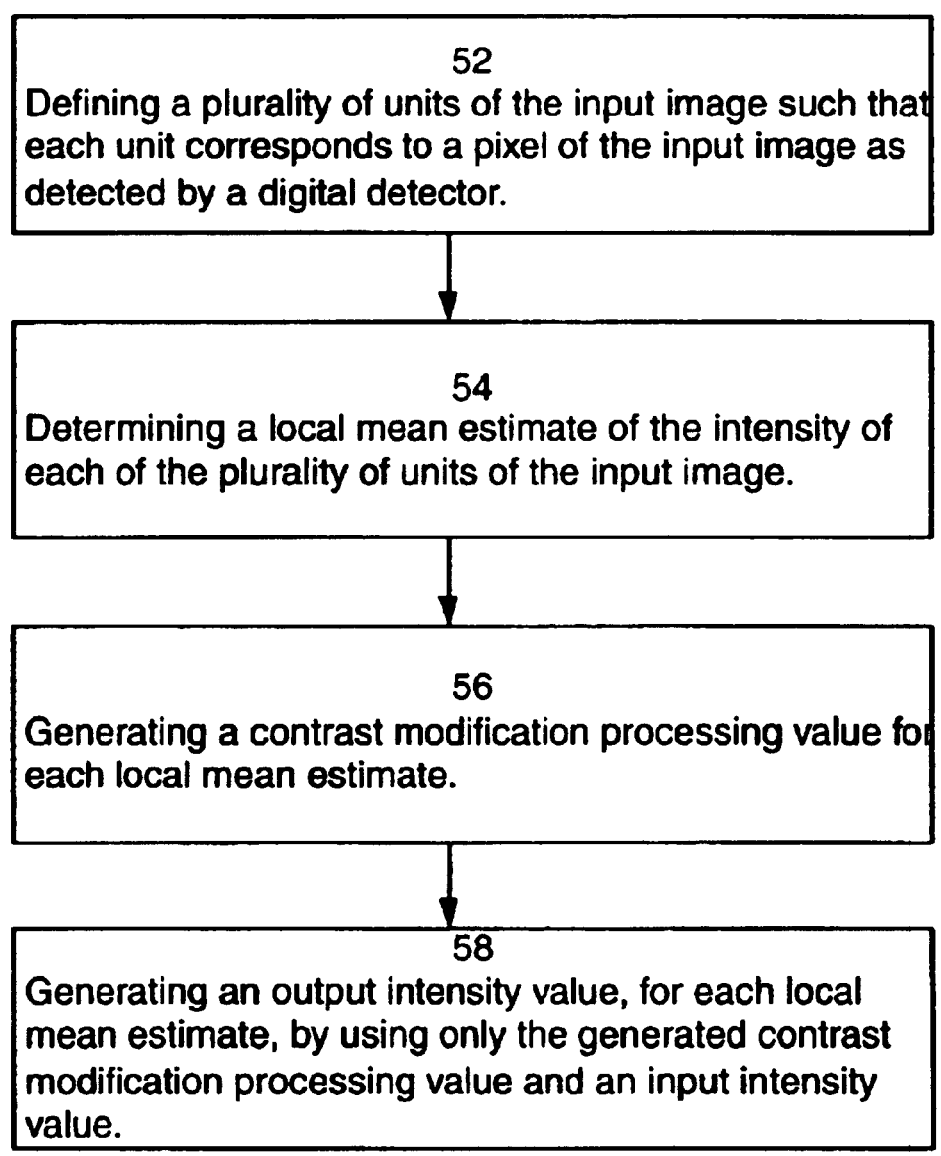
FIG. 3 is a flow diagram of a method of implementing and performing the C-DRM algorithm in accordance with an exemplary embodiment of the invention.

FIG. 3 is a flow diagram of a method 50 of implementing and performing the C-DRM algorithm in accordance with an exemplary embodiment of the invention. In one aspect of the invention a method 50 is provided for compressing an intensity dynamic range of an input image to a reduced intensity dynamic range of an image display device. The method includes defining 52 a plurality of units of each frame of the input image and determining 54 a local mean estimate of the intensity of each of the plurality of units of the input image. The method further includes generating 56 a contrast modification processing value for each local mean estimate, and generating 58 an output intensity value, for each local mean estimate, by using only the generated contrast modification processing value and an input intensity value.

Figure 4:
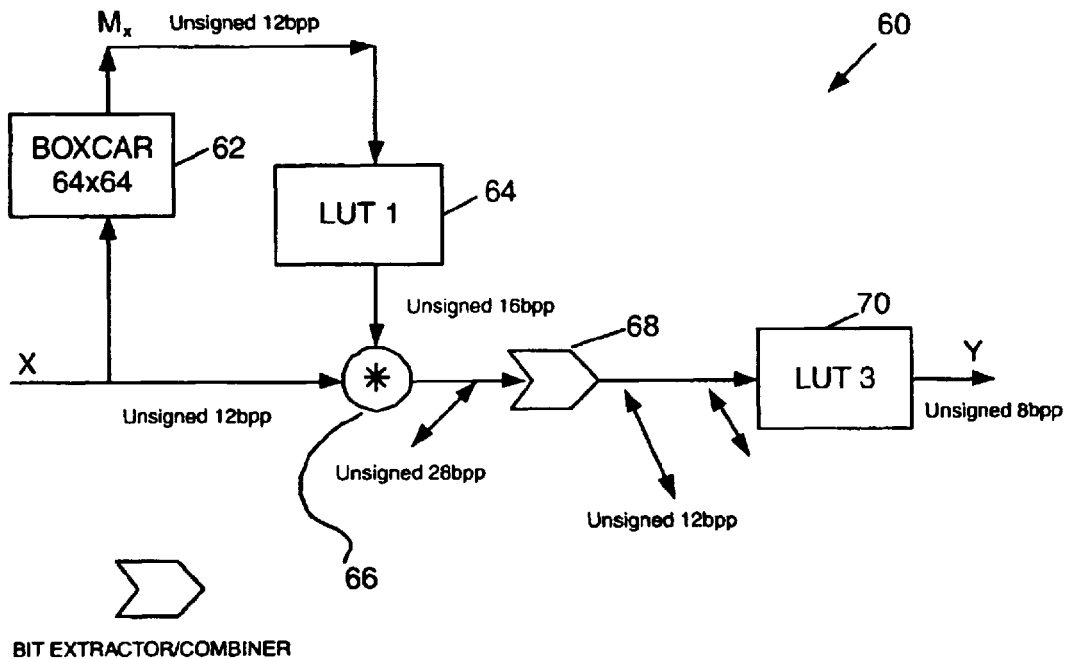
FIG. 4 is a flow diagram of an apparatus implementing and performing the C-DRM algorithm, in accordance with an alternative embodiment of the invention.

FIG. 4 illustrates a block diagram of a C-DRM processor 60 of the display-optimizing computer 12 of FIG. 1, in accordance with an exemplary embodiment of the invention. FIG. 4 is labeled with bit size designations relevant to practical implementations of the apparatus implementing and performing method 50 of FIG. 3. Thus, image input X is designated "unsigned 12 bpp", i.e., an unsigned 12 bit per pixel input image signal. Similarly, bit depths of intermediate processing results are likewise labeled in bits per pixel ("bpp"). Further image input X may be encoded to account for the framework of the specific invention. Encoding methods include, but are not limited to, linear encoded data and square-root encoded data.

Each block of the C-DRM processor 60 represents one or more functions, where:

X=input intensity value
$M_X$=local mean estimate
$C_X$=contrast estimate
$F_M(\ )$=mean modification function
$F_C(\ )$=contrast modification function
Y=C-DRM output intensity value
$M_Y$=modified local mean
$C_Y$=modified contrast The C-DRM processor 60 computes Y as follows:

$$C_X = \frac{X}{M_X} \quad (2)$$

$$C_Y = C_X * f_C(M_X) \quad (3)$$

$$M_Y = f_M(M_X) \quad (4)$$

$$C_Y = \frac{Y}{M_Y} = \frac{Y}{f_m(M_X)} \quad (5)$$

$$Y = C_Y * M_Y = [C_X * f_C(M_X)] * f_M(M_X) \quad (6)$$

$$Y = X * \frac{f_C(M_X) * f_M(M_X)}{M_X} = X * LUT_1 \quad (7)$$

$$LUT_{1OUT} = \frac{f_c(M_X) f_m(M_X)}{M_X} \quad (8)$$

$$CombinerInputValue = X * \frac{f_c(M_X) f_m(M_X)}{M_X} \quad (9)$$

In accordance with an implementation of the exemplary embodiment of the invention shown in FIG. 4, the input intensity value X of an input pixel is linearly encoded. The image is first processed by a "BOXCAR" (or moving average) function 62 to generate a local mean estimate $M_X$.

BOXCAR function 62 utilizes a plurality of units such as pixels, typically next-adjacent to and including the input pixel being processed, to calculate the local mean estimate $M_X$. In an alternative embodiment, BOXCAR 62 may also use any reasonable array size to perform the BOXCAR average. BOXCAR function 62 acts as a low pass filter which attenuates or eliminates high-frequency components while leaving low frequency components untouched. A low pass filter separates structures of interest from variations in the detection output which are less relevant, e.g., gradually varying background. In experimental implementations, a 32×32 BOXCAR resulted in ringing along contrast filled vessels, heart to lung transition, heart to diaphragm, contrast filled catheter, etc. A 64×64 BOXCAR avoids that deficiency by spanning a sufficient spatial area, or extent, such that contrast-liquid filled coronaries do not unduly influence the mean estimate of the background and sudden background changes, such as heart to lung, are more gradual. BOXCAR filters of a particular size require specification of the image resolution as projected onto the panel to be defined. The scope of this invention is not limited to any particular BOXCAR size.

The local mean estimate $M_X$ is then inputted to LUT1 64, which returns a contrast modification processing value ($LUT_{1OUT}$) for each $M_X$ input in accordance with equations (2–8) above. More specifically, a contrast modification function $f_C(M_X)$ is multiplied by a mean modification function $f_M(M_X)$ to generate a first value. The first value is divided by the local mean estimate $M_X$ to generate a second value. A look-up table is accessed, with reference to the second value, to generate a contrast and mean modification processing value ($LUT_{1OUT}$), also referred to herein as a contrast modification processing value. The contrast modification processing value is combined with the input intensity value X only in a multiplier 66. Multiplier 66 performs the multiplication function equation as denoted in equation (9) and outputs the combiner input value to a combiner/extractor 68. The bit extractor/combiner 68 extracts the integer portion of the output result of multiplier 66 and discards the fractional component. In an exemplary embodiment, combiner/extractor 68 outputs a composite (unsigned) 12 bpp extractor output value to generate an output intensity value Y within the reduced intensity range.

$$LUT_{1OUT} = \sqrt{\frac{f_c(M_X)f_m(M_X)}{M_X}} \qquad (10)$$

$$CombinerInputValue = X * \sqrt{\frac{f_c(M_X)f_m(M_X)}{M_X}} \qquad (11)$$

$$Y = \left[ X * \sqrt{\frac{f_c(M_X)f_m(M_X)}{M_X}} \right]^2 = X^2 * \frac{f_c(M_X)f_m(M_X)}{M_X} \qquad (12)$$

In an alternative embodiment, the input intensity value X of an input pixel is square-root encoded. The image is first processed by a "BOXCAR" (or moving average) function 62 to generate a local mean estimate $M_X$. The local mean estimate $M_X$ is then inputted to a LUT1 64, which returns a contrast modification processing value ($LUT_{1OUT}$) for each $M_X$ input in accordance with equation (10) above. More specifically, a contrast modification function $f_C(M_X)$ is multiplied by a mean modification function $f_M(M_X)$ to generate a first value. The first value is divided by the local mean estimate $M_X$ to generate a second value. A square-root of the second value is determined, and LUT1 64 is accessed to generate a contrast modification processing value ($LUT_{1OUT}$) which is combined with the square-root encoded input intensity value X in a multiplier 66. Multiplier 66 performs the multiplication function equation as denoted in equation (11) and outputs the combiner input value to a combiner/extractor 68. The bit extractor/combiner 68 extracts the integer portion of the output result of multiplier 66 and discards the fractional component such that the number of bits of the extractor output value correspond to a predetermined number of bits required by the image display device. In an exemplary embodiment, combiner/extractor 68 outputs composite (unsigned) 12 bpp extractor output value to a LUT3 70. LUT3 70 performs a squaring operation on the extractor output value to generate an output intensity value Y within the reduced intensity range as denoted in equation (12). In an alternative embodiment, the extractor output value is not limited to 12 bpp, but rather any value that generates an output intensity value Y within the reduced intensity dynamic range such as, but not limited to, 16 bpp.

Figure 5:
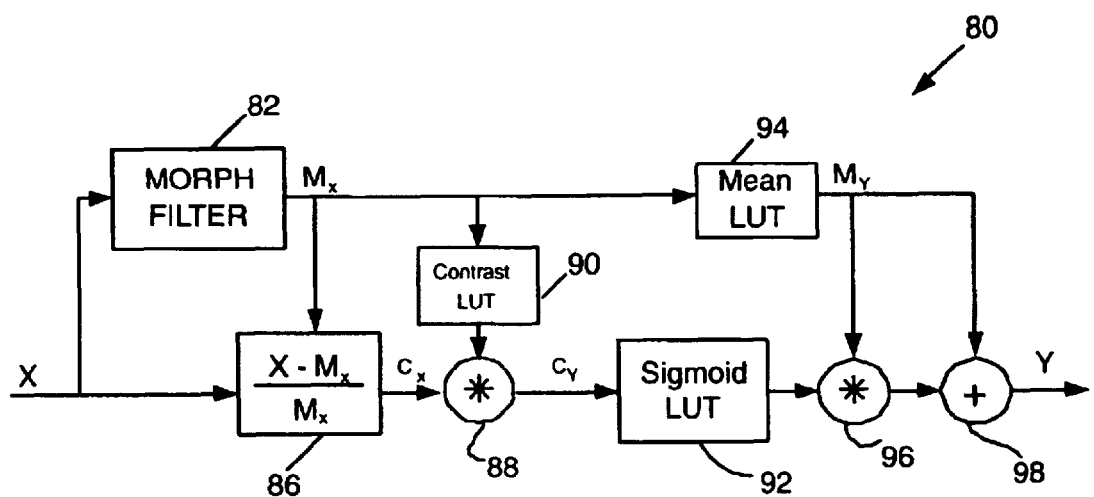
FIG. 5 is a flow diagram of an apparatus implementing and performing the C-DRM algorithm, in accordance with an exemplary embodiment of the invention.

FIG. 5 illustrates a block diagram of a C-DRM processor 80 of the display-optimizing computer 12 of FIG. 1, in accordance with an exemplary embodiment of the invention. FIG. 5 is labeled with bit size designations relevant to practical implementations of the apparatus implementing and performing method 50 of FIG. 3. Thus, image input X is designated "unsigned 12 bpp", i.e., an unsigned 12 bit per pixel input image signal. Similarly, bit depths of intermediate processing results are likewise labeled in bits per pixel ("bpp").

Each block of the C-DRM processor 80 represents one or more functions, where:

X=input intensity value
$M_X$=local mean estimate
$C_X$=contrast estimate
$F_M(\ )$=mean modification function
$F_C(\ )$=contrast modification function
Y=C-DRM output intensity
$M_Y$=modified local mean
$C_Y$=modified contrast The C-DRM processor 80 computes Y as follows:

$$C_X = \frac{X - M_X}{M_X} \qquad (13)$$

$$C_Y = C_X * f_C(M_X) \qquad (14)$$

$$C'_Y = \text{Sigmoid}(C_Y) \qquad (15)$$

$$M_Y = f_M(M_X) \qquad (16)$$

$$C_Y = \frac{Y - M_Y}{M_Y} \qquad (17)$$

$$Y = M_Y(C'_Y + 1) \qquad (18)$$

In accordance with the implementation of the exemplary embodiment of the invention shown in FIG. 5, an image is processed in accordance with equations (13–18) above. The input image is first processed by a morphological filter 82. Morphological filter 82 is used to estimate the background from a current image. Morphological filter 82 is designed to determine an optimal mask from a given image in order to perform a digital subtracted angiography. In this embodiment, morphological filter 82 is used to estimate the image background for optimal compression with contrast preservation and generate an input image to the C-DRM filter.

More specifically, an input intensity value X of a pixel in the input image is first processed by the morphological filter 82 to generate a local mean estimate $M_X$. The local mean estimate $M_X$ is then inputted to an arithmetic unit 86, which processes X in accordance with equation (13) above, and outputs the contrast estimate $C_X$ to a multiplier 88. A contrast LUT 90 processes $M_X$ in accordance with the contrast modification function $F_C(\ )$ of equation (14) above and supplies the contrast gain, the output $f_C(M_X)$ thereof, to multiplier 88 which performs the multiplication function of equation (14) and produces the modified contrast $C_Y$ output to a Sigmoid LUT 92 in accordance with equation (15) above. The sigmoid LUT 92 function is applied to the modified contrast $C_Y$ output and used to enable linear preservation of small inputs and non-linear and asymmetrical compression of large inputs, Alternatively, a mathematical function may be used to replace Sigmoid LUT 92. The use of the morphological filter for mean estimation and the sigmoid LUT for tuning contrast may be applied separately or jointly and are not dependent on each other. In another embodiment, Sigmoid LUT 92 can be used with a BOXCAR function, a morphological filter, or any other mean estimator such as, but not limited to, a median filter.

Mean LUT function 94 processes the local mean estimate $M_X$ by the mean modification function $F_M(\ )$ of equation (16), above, to output the modified local mean $M_Y$. The mean modification function $F_M(\ )$ compresses the low frequency component of the input intensity X, directly and separately from (i.e., independently of) the contrast component. A component 96 multiplies the Sigmoid LUT 92 output and Mean LUT 94 output to generate a value which is then combined with Mean LUT 92 in an adder 98, outputting the C-DRM output intensity Y to display 34, thereby to reproduce the image thereon in the reduced intensity dynamic range supported by display 34 as depicted in FIG. 1.

While the invention has been described in terms of various specific embodiments, those skilled in the art will recognize that the invention can be practiced with modification within the spirit and scope of the claims.

We claim:

1. A method for compressing an intensity dynamic range of an input image to a reduced intensity dynamic range of an image display device, said method comprising:
    defining a plurality of units of the input image;
    determining a local mean estimate of an intensity of each of the plurality of units of the input image;
    generating a first value by multiplying a contrast modification function by a mean modification function;
    generating a second value by dividing the first value by the local mean estimate;
    accessing a look-up table with reference to the second value and returning a contrast modification processing value; and
    generating an output intensity value, for each local mean estimate, by using only the generated contrast modification processing value and an input intensity value.

2. A method in accordance with claim 1 wherein defining a plurality of units comprises:
    defining a plurality of units such that each unit corresponds to a pixel of the input image as detected by an image detector; and
    defining a plurality of units such that each unit corresponds to an input intensity value that is at least one of a square-root encoded input intensity value and a linear encoded input intensity value.

3. A method in accordance with claim 1 further comprising multiplying the generated contrast modification processing value and an input intensity value to generate a combiner input value.

4. A method in accordance with claim 3 further, comprising processing the combiner input value with a bit extractor/combiner to generate an extractor output value such that the number of bits of the extractor output value correspond to a predetermined number of bits required by the image display device.

5. A method in accordance with claim 2 wherein generating a contrast modification processing value comprises:
    generating a first value by multiplying a contrast modification function by a mean modification function;
    generating a second value by dividing the first value by the local mean estimate; and
    generating a contrast modification processing value by determining the square-root of the second value.

6. A method in accordance with claim 5 further comprising multiplying the generated contrast modification processing value and an input intensity value to generate a combiner input value.

7. A method in accordance with claim 6 further comprising processing the combiner input value with a bit extractor/combiner to generate an extractor output value such that the number of bits of the extractor output value correspond to a predetermined number of bits.

8. A method in accordance with claim 7 further comprising squaring the extractor output value to generate a respective output intensity value within the reduced intensity range.

9. A method in accordance with claim 5 further comprising accessing a look-up table with reference to the square root of the second value and returning a contrast modification processing value.

10. A method in accordance with claim 8 further comprising accessing a look-up table with reference to the extractor output value and returning a respective output intensity value within the reduced intensity range.

11. A method for compressing an intensity dynamic range of an input image to a reduced intensity dynamic range of an image display device, said method comprising:
    defining a plurality of units of the input image such that each unit corresponds to a pixel of the input image as detected by an image detector and a scan line of an analog image detector;
    determining a local mean estimate of an intensity of each of the plurality of units of the input image;
    generating a contrast modification processing value for each local mean estimate by multiplying a contrast modification function by a mean modification function to generate a first value, dividing the first value by the local mean estimate to generate a second value, and accessing a look-up table with reference to the second value to generate a contrast modification processing value; and
    generating an output intensity value, for each local mean estimate, by using only the generated contrast modification processing value and an input intensity value.

12. An apparatus for compressing an intensity dynamic range of an input image to a reduced intensity dynamic range of an image display device, said apparatus comprising:
    an image detector; and
    a computer coupled to said image detector and configured to:
    define a plurality of units of the input image;
    determine a local mean estimate of an intensity of each of the plurality of units of the input image;
    generate a first value by multiplying a contrast modification function by a mean modification function;

generate a second value by dividing the first value by the local mean estimate;

access a look-up table with reference to the second value and return a contrast modification processing value; and generate an output intensity value, for each local mean estimate, by using only the generated contrast modification processing value and an input intensity value.

13. An apparatus in accordance with claim 12 wherein to define a plurality of units, said computer further configured to:

define a plurality of units such that each unit corresponds to a pixel of the input image as detected by an image detector; and define a plurality of units such that each unit corresponds to an input intensity value that is at least one of a square-root encoded input intensity value and a linear encoded input intensity value.

14. An apparatus in accordance with claim 12 wherein to generate a combiner input value, said computer further configured to multiply said generated contrast modification processing value by a input intensity value.

15. An apparatus in accordance with claim 14 wherein to generate an extractor output value such that the number of bits of the extractor output value correspond to a predetermined number of bits required by the image display device, said computer further configured to process said combiner input value with a bit extractor/combiner.

16. An apparatus in accordance with claim 13 wherein to generate a contrast modification processing value, said computer further configured to:

generate a first value by multiplying a contrast modification function by a mean modification function;

generate a second value by dividing the first value by a local mean estimate; and generate a contrast modification processing value by determining the square-root of the second value.

17. An apparatus in accordance with claim 16 wherein to generate a combiner input value, for each local mean estimate, said computer further configured to multiply said generated contrast modification processing value by a square-root encoded input intensity value.

18. An apparatus in accordance with claim 17 wherein to generate an extractor output value such that the number of bits of the extractor output value correspond to a predetermined number of bits required by the image display device, said computer further configured to process the combiner input value with a bit extractor/combiner.

19. An apparatus in accordance with claim 18 wherein to generate a respective output intensity value within the reduced intensity range, said computer further configured to square said extractor output value.

20. An apparatus in accordance with claim 16 wherein to return said contrast modification processing value, said computer further configured to access a look-up table with reference to the square root of the second value.

21. An apparatus in accordance with claim 19 wherein to return a respective output intensity value within the reduced intensity range, said computer further configured to access a look-up table with reference to the extractor output value.

22. A computer readable medium encoded with a program executable by a computer for compressing an intensity dynamic range of an input image to a reduced intensity dynamic range of an image display device, said program configured to instruct the computer to:

define a plurality of units of the input image;

determine a local mean estimate of an intensity of each of the plurality of units of the input image;

generate a first value by multiplying a contrast modification function by a mean modification function;

generate a second value by dividing the first value by the local mean estimate;

access a look-up table with reference to the second value and return a contrast modification processing value; and generate an output intensity value, for each local mean estimate, by using only the generated contrast modification processing value and an input intensity value.

23. A computer readable medium in accordance with claim 22 wherein to define a plurality of units, said program further configured to:

define a plurality of units such that each unit corresponds to a pixel of the input image as detected by an image detector; and define a plurality of units such that each unit corresponds to an input intensity value that is at least one of square-root encoded and linear encoded.

24. A computer readable medium in accordance with claim 22 wherein to generate a combiner input value, said program further configured to multiply the generated contrast modification processing value by an input intensity value.

25. A computer readable medium in accordance with claim 22 wherein to generate an extractor output value such that the number of bits of the extractor output value correspond to a predetermined number of bits required by the image display device said computer further configured to process the combiner input value with a bit extractor/combiner.

26. A computer readable medium in accordance with claim 22 wherein to generate a contrast modification processing value, said program further configured to:

generate a first value by multiplying a contrast modification function by a mean modification function;

generate a second value by dividing the first value by a local mean estimate; and generate a contrast modification processing value by determining the square-root of the second value.

27. A computer readable medium in accordance with claim 26 wherein to generate a combiner input value, for each local mean estimate, said program further configured to multiply said generated contrast modification processing value by a square-root encoded input intensity value.

28. A computer readable medium in accordance with claim 27 wherein to generate an extractor output value such that the number of bits of the extractor output value correspond to a predetermined number of bits required by the image display device, said computer further configured to process the combiner input value with a bit extractor/combiner.

29. A computer readable medium in accordance with claim 28 wherein to generate a respective output intensity value within the reduced intensity range, said program further configured to square said extractor output value.

30. A computer readable medium in accordance with claim 27 wherein to return a contrast modification processing value, said program further configured to access a look-up table with reference to the square root of the second value.

31. A computer readable medium in accordance with claim 29 wherein to return a respective output intensity value within the reduced intensity range, said program further configured to access a look-up table with reference to the extractor output value.

32. A method for compressing an intensity dynamic range of an input image to a reduced intensity dynamic range of an image display device, said method comprising:

defining a plurality of units of the input image;

determining a local mean estimate of an intensity of each of the plurality of units of the input image using a morphological filter;

generating a first value by multiplying a contrast modification function by a mean modification function;

generating a second value by dividing the first value by the local mean estimate;

accessing a look-up table with reference to the second value and returning a contrast modification processing value; and generating an output intensity value, for each local mean estimate, by using the generated contrast modification processing value and an input intensity value.

33. A method according to claim 32 wherein generating an output intensity value comprises generating an output intensity value for each local mean estimate by using only the generated contrast modification processing value and an input intensity value.

* * * * *